United States Patent
Ilg

(10) Patent No.: US 6,754,513 B1
(45) Date of Patent: Jun. 22, 2004

(54) METHOD AND CONFIGURATION FOR IDENTIFICATION OF A MOBILE STATION ASSOCIATED WITH A BASE STATION

(75) Inventor: Johannes Ilg, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 395 days.

(21) Appl. No.: 09/642,803

(22) Filed: Aug. 21, 2000

(30) Foreign Application Priority Data

Aug. 19, 1999 (DE) .......................................... 199 39 365

(51) Int. Cl.[7] .............................. H04B 1/38; H04M 1/00
(52) U.S. Cl. .................... 455/574; 455/572; 455/343.1; 455/343.2; 455/343.3
(58) Field of Search ................................ 455/572, 574, 455/343, 343.1, 343.2, 343.3

(56) References Cited

U.S. PATENT DOCUMENTS

| | | | |
|---|---|---|---|
| 4,763,121 A | * | 8/1988 | Tomoda et al. |
| 5,686,891 A | | 11/1997 | Sacca et al. |
| 5,812,085 A | | 9/1998 | Barraza et al. |
| 5,838,257 A | * | 11/1998 | Lambropoulos |
| 6,026,165 A | * | 2/2000 | Marino et al. |
| 6,037,675 A | | 3/2000 | Yoshida et al. |
| 6,084,922 A | | 7/2000 | Zhou et al. |
| 6,144,865 A | | 11/2000 | Pichard |
| 6,236,850 B1 | * | 5/2001 | Desai |
| 6,347,236 B1 | * | 2/2002 | Gibbons et al. |
| 6,493,539 B1 | * | 12/2002 | Falco et al. |

FOREIGN PATENT DOCUMENTS

| | | |
|---|---|---|
| DE | 198 08 487 A1 | 9/1998 |
| EP | 0 726 687 A1 | 8/1996 |
| EP | 0 865 167 A2 | 9/1998 |
| GB | 2 280 086 A | 1/1995 |
| GB | 2 297 884 A | 8/1996 |
| GB | 2 324 681 A | 10/1998 |
| WO | WO 93/25987 | 12/1993 |
| WO | WO 94/13089 | 6/1994 |
| WO | WO 95/29568 | 11/1995 |
| WO | WO 96/19084 | 6/1996 |
| WO | WO 96/38010 | 11/1996 |
| WO | WO 98/37653 | 8/1998 |

* cited by examiner

Primary Examiner—Sinh Tran
Assistant Examiner—Huy Nguyen
(74) Attorney, Agent, or Firm—Laurence A. Greenberg; Werner H. Stemer; Gregory L. Mayback

(57) ABSTRACT

The invention encompasses a method for identification of a mobile station which is assigned to a base station. The base station has a first low-power mode in which the base station transmits on a clock cycle. The mobile station receives on the same clock cycle and carries out an initial check to determine whether a base station signal is being received. The mobile station has a second high-power mode in which the mobile station lengthens the time period of reception to synchronize with the clock cycle and interchange identification data with the base station. The invention also encompasses a circuit arrangement in particular for carrying out the method.

41 Claims, 2 Drawing Sheets

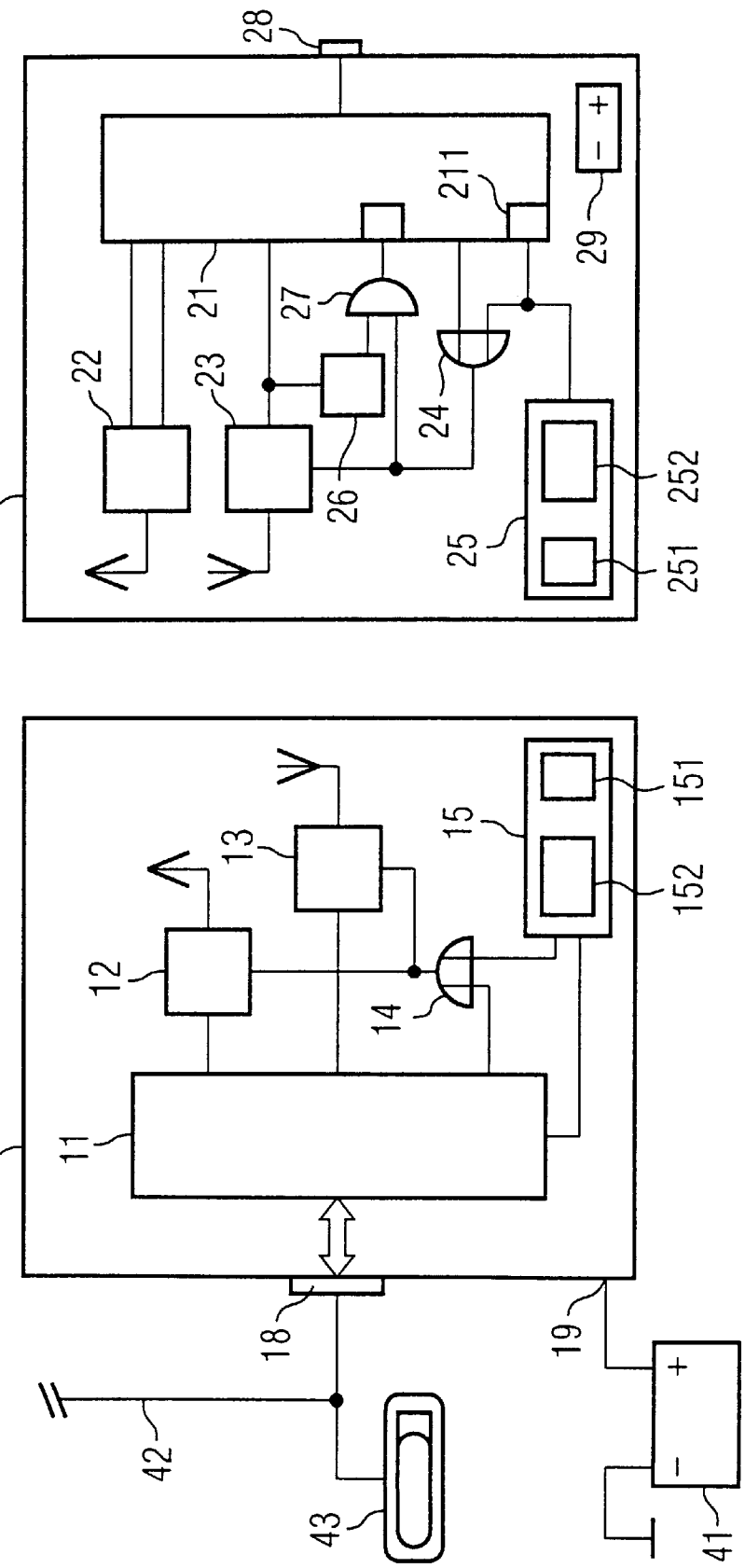

FIG 2A
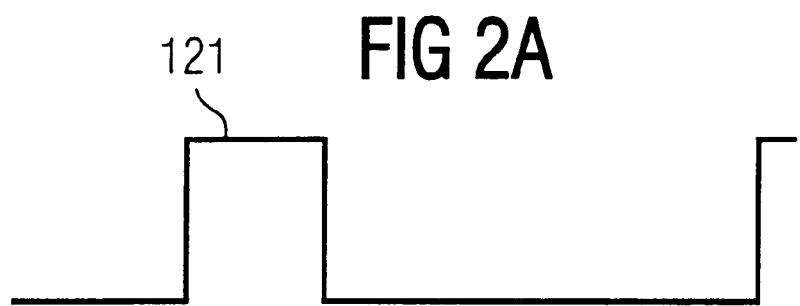
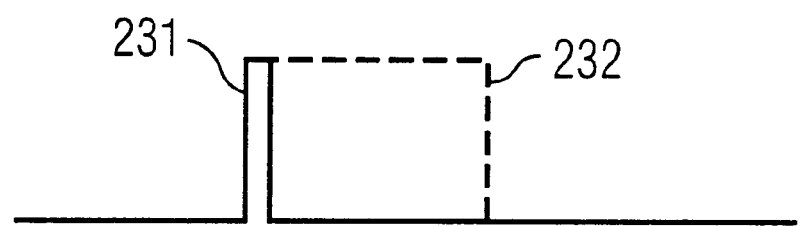
FIG 2B
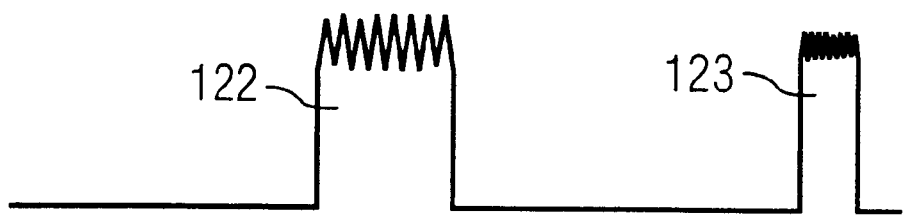

METHOD AND CONFIGURATION FOR IDENTIFICATION OF A MOBILE STATION ASSOCIATED WITH A BASE STATION

BACKGROUND OF THE INVENTION

Field of the Invention

The invention relates to a method and a circuit configuration for identification of a mobile station that is associated with a base station used in particular for identification systems. The mobile station can be an ID transmitter that is carried by a user. One significant field of application is remote controls for vehicle technology, in which the ID transmitter carried on the driver's body is used to initiate functions on a vehicle, which is acting as the base station. In particular, these functions include unlocking the door, enabling the immobilizer, and/or initiating functions on the ID transmitter, such as status indications.

An autonomous power supply is generally provided in each of the mobile station and the base station. In order firstly to minimize the physical size and weight of such a power supply, and secondly to maximize the operating life as far as possible, the power consumption of the stations should be kept as low as possible. Minimizing power consumption is of major importance, particularly for portable mobile stations.

The prior art shows various methods for minimizing power consumption. One method envisages that the mobile station is provided with a receiver having a particularly low current draw in order to reduce the power consumption, and that the base station transmits only upon operation by the user. A disadvantage in this case is that the current-saving receivers used have a broad bandwidth and are sensitive to interference so that their range is only short; furthermore, the user convenience is only low, since active operation is always required.

Other methods have been developed in which the receiver and transmitter in the base station and the mobile station do not operate continuously, but only at occasional periods (e.g., on a clock cycle). However, in order to ensure that a transmitted signal is received, the reception duration must be relatively long, namely corresponding to the clock interval of the transmitter. Although providing for activation to take place only on demand, namely on operation by the user, is possible, such an addition is disadvantageous for user convenience.

SUMMARY OF THE INVENTION

The object of the invention is to provide a method and a circuit arrangement for identification of a mobile station having an associated base station that combines the advantages of low power consumption and high user convenience.

With the foregoing and other objects in view there is provided, in accordance with the invention, a method for identification of a mobile station associated with a base station. The method includes the following steps.

Providing a base station having a transmitter and a receiver; and a mobile station having a first low-power mode, a second high-power mode, a transmitter, a receiver, and a clock transmitter connected to said receiver for switching on the receiver on a clock cycle, a wake-up unit connected downstream of the receiver, an evaluation unit connected downstream of the wake-up unit, and a reception interval lengthening unit with an input and an output, the input connecting to the wake-up unit, and the output connected to the clock transmitter.

Generating a clock signal in the base station with the clock transmitter. Generating a clock signal in the mobile station with the clock transmitter that is equal length as the clock signal in the base station. Transmitting periodically based on the clock signal a base station signal from the base station in the low-power mode. Receiving the base station signal in the mobile station being in the first low-power mode. Determining whether the base station signal is being received in the mobile station. Entering the second high-power mode in the mobile station after the base station signal has been received in the mobile station. Lengthening a time period of reception in synchronism with the clock cycle. And, interchanging identification data between the mobile station and the base station.

In accordance with another feature of the invention, the method includes producing a wake-up signal in the mobile station. Then, switching of an evaluation unit to an active state once the second high-power mode has been entered. Then, transmitting an unmodulated request signal from the mobile station once the second high-power mode had been entered.

In accordance with another feature of the invention, in the low-power mode, the reception time period of the mobile station is shorter than the transmission time period of the base station. Preferably, the reception time period of the mobile station is one half to one twentieth the transmission time period of the base station. Most preferably, the reception time period of the mobile station is one-tenth the transmission time period of the base station.

In accordance with another feature of the invention, the clock period is between one and ten seconds. More preferably, the clock period is between four and six seconds.

In accordance with another feature of the invention, the transmission time period is between ten microseconds and one second. More preferably, the transmission time period is between one-hundred microseconds and five milliseconds.

In accordance with another feature of the invention, the interchanging of identification data between the mobile station and the base station includes: transmitting a first identification signal by the base station; receiving and evaluating the first identification signal in the mobile station; reverting to the first low power mode in the mobile station if the result is negative and transmitting a second identification signal if the result is positive, and receiving and evaluating the second identification signal in the base station, the base station reverting to the first low-power mode if the result is negative and carrying out an enable function if the result is positive.

In accordance with another feature of the invention, the interchanging of identification data between the mobile station and the base station is encrypted based on a changing key. Preferably, this key is a count of the clock transmitter.

In accordance with another feature of the invention, the method further includes synchronizing the clock transmitters in the base station and in the mobile station. This synchronizing can includes the following steps: checking that the clock in the mobile station and the clock in the base station are unsynchronized and, if this occurs; transmitting a signal for a time period which is at least as long as the clock period minus the time period of reception; transmitting a synchronization signal between the base station and the mobile station, and setting at least one of the mobile station clock transmitter and the base station clock transmitter with the synchronization signal.

In accordance with another feature of the invention, the synchronization signal is precise with the clock transmitter of the base station.

The invention also encompasses A configuration for identification of a mobile station associated with a base station. The configuration includes the following: a base station having a transmitter and a receiver; and a mobile station having a transmitter and a receiver, and a clock transmitter connected to the receiver for switching on the receiver on a clock cycle, a wake-up unit connected downstream of the receiver, an evaluation unit connected downstream of the wake-up unit, and a reception interval lengthening unit with an input and an output, the input connecting to the wake-up unit, and the output connected to the clock transmitter.

In accordance with another feature of the invention, the wake-up unit has an initial evaluation module.

In accordance with another feature of the invention, the clock transmitter has an oscillating element and a frequency divider unit. The oscillating element can be a quartz crystal.

In accordance with another feature of the invention, the frequency divider unit is a programmable counter.

In accordance with another feature of the invention, the evaluation unit includes a synchronization module connected to the counter and to the receiver designed for loading a corrected count.

In accordance with another feature of the invention, the synchronization module is designed for calculating a correction value from an uncorrected count and a corrected count.

Accordingly, a method for identification of a mobile station that is associated with a base station has a low-power mode and a high-power mode, to which the mobile station changes when a signal is received from the base station.

In the low-power mode, the base station transmits periodically on a clock cycle. That is, a clock in the base station having a specific clock cycle switches a transmitter in the base station periodically on and off based on the clock cycle. The mobile station then receives on the same clock cycle. That is, a receiver in the mobile station switches on and off in a corresponding manner. Also, the mobile station determines whether the signal being received is actually a base station signal from the base station.

If the initial check leads to the result that a base station signal is being received (i.e., the mobile station is near a base station), then the mobile station changes to the high-power mode. In the high-power mode, the time period during which the receiver in the mobile station is switched on is lengthened, preferably by a factor of ten, and synchronized with the clock cycle. In this case, the clock period formed from the sum of the switched-on time and the switched-off time remains constant.

Finally, in the high-power mode, the mobile station and the actual identification is carried out by interchanging identification data between the mobile station and the base station. Because, in the low-power mode, the mobile station just needs to check whether any signal originating from a base station is present at all, the receiver need be switched on only for a very short time. Only when such a signal is being received, need the receiver be switched on for a longer time, in order to allow data to be interchanged.

The initial check avoids changes to the high-power mode being made just due to the reception of interference signals, which would unnecessarily increase the energy consumption. When a base station signal is received, the period for which the receiver is switched on is increased, so that identification data can then be interchanged. Furthermore, the clock cycle process means that the only signals considered are those from base stations which are transmitted in synchronism with the period for which the receiver in the mobile station is switched on.

Splitting the method in two can save energy. Namely, the method can be split into a low-power mode, which is normally used, and a high-power mode, which is used only when required and in which the period for which the receiver is switched on is lengthened. This on the one hand lengthens the operating life and on the other hand allows the transmission power and thus the range to be increased. The method according to the invention furthermore allows the receiver to be designed for high quality and sensitivity and not only for a low current draw.

By suitable selection of the period used for the transmitter and receiver clocks, and the time period per clock cycle for which the transmitter and receiver are switched on, the interchange of identification data, and thus the identification process, can be completed shortly after the mobile station comes into range of the transmitter of the base station. Thus, for example, the central locking system of a car can be opened even before the driver reaches his car and operates the door handle. The convenience of use is thus just as high as with methods using continuous transmission and reception, but with reduced power consumption.

The method according to the invention uses the cycling process not only to reduce the energy consumption, but for pre-selecting the associated base station.

The clock cycle period is expediently chosen to be between one second and ten seconds (1 s–10 s), preferably four seconds to six seconds (4 s–6 s), with a transmission time period between ten microseconds and one second (10 $\mu$s–1 s), preferably between one hundred microseconds and five milliseconds (100 $\mu$s–5 ms).

In one particularly expedient embodiment of the invention for independent protection, the clock transmitters arranged in the base station and mobile station are synchronized in such away that the process comprises the following steps: checking for an event which indicates an unsynchronized state and; if this occurs, transmitting a signal for a time period which is at least as long as the clock period minus the period for which the receiver is switched on; transmitting of a synchronization signal between the base station and the mobile station, and setting of at least one of the clock transmitters by means of the synchronization signal.

The clock transmitters in the mobile station and the base station must therefore be synchronized at least once, initially, in order to ensure that the mobile station and the base station are operating with the same clock cycle. That is, the receiver in the mobile station switches on when the base station is transmitting. Renewed synchronization may be required if the clock transmitters deviate from one another, for example due to tolerances.

The invention also covers a circuit arrangement having a base station and having at least one mobile station. Each of the base station and the mobile station have a transmitter and a receiver. The mobile station has a clock transmitter which is connected to the receiver, for switching on the receiver on a clock cycle. The mobile station has a wake-up unit connected downstream of the receiver and an evaluation unit connected downstream of the wake-up unit. With the invention providing a base station having a clock transmitter connected to its transmitter, and the mobile station having a reception time lengthening unit whose input is actuated by the wake-up unit and whose output is applied to the receiver, with the wake-up unit having an initial checking module.

In such embodiments, the initial checking module checks an initial signal received by the receiver. The wake-up unit produces a wake-up signal only if the result of the initial check is positive. As a result of which, the evaluation unit then changes to an active state. The evaluation unit may have a switching unit for this purpose, for example in the form of a transistor switch, so that the evaluation unit is not supplied with any current in the low-power mode.

In order to reduce the power consumption further, the initial checking module is expediently designed using analog technology, that is to say without a microprocessor, in order to avoid current-drawing active components as far as possible.

The clock transmitters are expediently designed such that they each have an oscillating element and a frequency divider unit. A quartz crystal is advantageously provided as the oscillating element. It is particularly advantageous for the frequency divider unit to be in the form of a programmable counter. This results in a stable-frequency and easily adjustable clock being produced. The latter is particularly advantageous for synchronization of the clock transmitters. To this end, the evaluation unit is expediently provided with a synchronization module, which is connected to the counter and is designed for programming in a corrected count.

Other features that are considered as characteristic for the invention are set forth in the appended claims.

Although the invention is illustrated and described herein as embodied in a method and configuration for identification of a mobile station associated with a base station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a block diagram of an exemplary embodiment of the configuration according to the invention; and FIG. 2a shows a timing diagram for signals in the low-power mode of the method according to the invention.

FIG. 2b shows a timing diagram for in the high-power mode of the method according to the invention.

DESCRIPTION OF THE PREFERRED EMBODIMENTS

As shown in FIG. 1, the circuit arrangement according to the invention has a base station 1 and an associated mobile station 2. The mobile station 2 is physically separated from the base station 1.

The base station 1 comprises a control unit 11, which is connected to a transmitter 12 and a receiver 13, as well as a clock transmitter 15. Electrical power from an energy store, for example a car battery 41, is passed via a power supply connection 19 and via supply connections which are not shown to the elements of the base station 1. The base station is connected via a data connection 18 to its environment, for example to a central data bus 42 in a motor vehicle.

The control unit 11 is a microprocessor using current-saving technology. The transmitter 12 and the receiver 13 are a radio transmitter and receiver, respectively, for the 433 MHz frequency band; microwave transmission may also be provided, with a back-scatter transmitter and a spread-spectrum receiver for the 2.45 GHz frequency band.

The clock transmitter 15 has a quartz crystal clock 151 at a frequency of 32 kHz, and a programmable counter 152 as a frequency divider. The phase of the clock 151 can be determined by loading a different count, and the period of the clock 151 can be determined by programming a different division factor. The clock transmitter 15 is connected to the transmitter 12 and to the receiver 13 via an OR circuit 14, which acts as a lengthening unit.

The mobile station 2 comprises a transmitter 22, a receiver 23, an initial checking module 26, an OR circuit 24 which acts as a reception period lengthening unit, a clock transmitter 25, an evaluation unit 21, a display element 28 and a battery 29. The battery 29 is electrically connected to and powers the other elements of the mobile station 2. The transmitter 22 and receiver 23 are designed in a corresponding manner to the transmitter 12 and the receiver 13 for radio waves or microwaves.

The evaluation unit 21 is in the form of a microprocessor using current-saving technology, or using a programmable logic circuit, for example PAL. An output of the receiver 23 is connected to the evaluation unit 21, and to one input of the initial checking module 26. One output of the initial checking module 26 is connected to the wake-up unit 27, which is in turn connected to the evaluation unit 21.

The inputs of the OR circuit 24 are connected to the clock transmitter 25 and to the evaluation device 21. The output of the OR circuit 24 is connected to an enable connection of the receiver 23, and to one input of the wake-up unit 27. The evaluation device 21 has a synchronization module 211 that is connected to the clock transmitter 25. Furthermore, the evaluation device 21 is connected to one input and to an enable connection of the transmitter 22, and to the display device 28.

The clock transmitter 25 has a quartz crystal clock 251 at a frequency of 32 kHz and a programmable counter 252 as a frequency divider. The phase of the clock can be varied by loading a different count, and the period of the clock can be varied by programming a different division factor with the assistance of the synchronization module 211.

The circuit arrangement is operated by using the method encompassed by the invention. The stated times relate to those in a proven exemplary embodiment.

In the first method mode, the low-power mode, the base station 1 uses its transmitter 12 to transmit a transmitted pulse repeatedly at a clock cycle of five seconds (5 s), using a clock cycle produced by the clock transmitter 15. This transmitted pulse is an unmodulated carrier pulse 121 with a duration of one-hundred microseconds (100 $\mu$s).

The mobile station 2 uses its receiver 23 to receive for a time period 231 of ten microseconds (10 $\mu$s), likewise repeatedly at a clock cycle of five seconds (5 s), once again, using a clock cycle produced by its clock transmitter 25. Previous synchronization of the clock transmitters 15 and 25 ensures that the transmitted pulse 121 and the period 231 for which the receiver 23 is switched on overlap. Ideally, the synchronization is set such that the receiver 23 is switched on for approximately half the transmitted pulse.

Such setting allows sufficient time for any transient processes, which typically require a time of about five microseconds (5 $\mu$s). Furthermore, there is a considerable tolerance for synchronization errors in this case. Transmission is thus still possible even with a synchronization error of virtually fifty microseconds (50 $\mu$s).

Sometimes resynchronization is still required. Synchronization may no longer exists due to the clock transmitters 15, 25 drifting apart from one another because of tolerances. Another reason ending synchronization, is the replacement of the battery 29 in the mobile station 2. The method for resynchronization when required is described in the following text.

The method remains in the low-power mode for as long as the mobile station 2 is not within range of the base station 1. That is as long as the mobile station 2 does not receive any signal from the base station 1 or from any other base station operating using this method.

When the mobile station 2 receives a signal from the base station 1, then its initial checking module 26 carries out an initial check to determine whether the received signal is a base station signal or was only a randomly received interference signal.

In the exemplary embodiment, the initial checking module 26 checks whether the received signal is a carrier signal at a predetermined "correct" frequency. The initial check thus leads to a positive result when the two following conditions are satisfied:

a signal must actually be received. That is, the transmission clock cycle of the base station must be synchronized to the reception clock cycle of the mobile station 2, and the received signal must be a carrier signal at the correct frequency.

The method does not change to its second mode, the high-power mode, unless both of these conditions are satisfied. Because the two said conditions must be satisfied cumulatively to do this, the change to the high-power mode takes place with some certainty only when the received base station signal originates from the associated base station 1. The probability that another base station uses the same carrier frequency (for example that of another motor vehicle of the same type) that is synchronized appropriately such that its transmitted signal is received during the reception period of the mobile station 2 is approximately one to one hundred thousand (1:100,000), based on the stated times and tolerances.

This is where the invention has a particular advantage, in that it uses the clock cycle process not only to save energy, but also as an effective means for initial checking, in order to avoid unnecessary changes to the high-power mode as a result of false alarms.

As can be seen from what has been said above, although the initial check leads to a positive result in response to an "incorrect" base station only rarely, the initial check cannot, however, on its own absolutely confirm whether the received base station is the associated base station 1, or some other base station. Since it requires a high-power transmission process by the mobile station 2, this test remains reserved for the following mode.

If the result of the initial check is positive, the method changes to a second mode, the high-power mode. To this end, the wake-up unit 27 produces a wake-up signal which causes the evaluation unit 21 to be activated and, via the latter and the OR circuit 24, lengthening 232 the period for which the receiver 23 in the mobile station 2 is switched on. An example of such lengthening 232 could be from ten microseconds to one hundred microseconds (10 $\mu$s–100 $\mu$s).

Furthermore, the mobile station 2 uses its transmitter 22 to transmit a request signal 221 to the base station 1. This is preferably a carrier frequency signal with a duration of ten microseconds (10 $\mu$s). Via its receiver 13, the base station 1 receives the request signal 221 and then transmits a first identification signal 122, for example a signal modulated in accordance with a specific pattern, via its transmitter 12. Obviously, the transmitter 12 and receiver 13 in the base station are switched on during this process.

Via the receiver 23 of the mobile station 2, which is switched on due to the lengthening 232 of the period for which the mobile station 2 is still active, the mobile station 2 receives the first identification signal 122 originating from the base station 1, and passes this first identification signal 122 to the evaluation unit 21.

The evaluation unit 21 checks whether the received first identification signal 122 is a signal from the associated base station 1. If the result is negative (the identification signal 122 is not from the associated base station 1) the mobile station reverts to the first mode, the low-power mode. To switch to the low-power mode, activated units are switched back to the inactive state and, furthermore, the lengthening 232 of the reception period is canceled. If the result is positive, the mobile station 2 forms a second identification signal 222. Encrypting the first identification signal 122 expediently forms the second identification signal 222. An example of this encryption includes multiplying the first identification signal 122 by a fixed identity number of the mobile station 2.

In addition to such a fixed key, a variable key may alternatively or additionally also be used. For example, a count of the clock transmitter 25 might be used to encrypt the first identification signal to form the second identification signal. Such encryption methods are known per se and do not need to be described in any more detail here. The second identification signal 222 is transmitted via the transmitter 22 in the mobile station 2 to the base station 1 and, furthermore, a sequence timer (not illustrated) is started.

The base station 1 receives the second identification signal 222 by means of its receiver 13. The base station 1 checks this signal by means of the control unit 11. If the result is positive (the mobile station 2 is associated with this base station 1), a function is initiated via the data connection 18, for example, causing the central locking system to open and an immobilizer to deactivate. A confirmation signal 123 may also be transmitted to the mobile station 2. Then, the mobile station 2 actuates a display element such as a light-emitting diode 28.

If the result is negative, the base station 1 reverts to the low-power mode and, for this purpose, activated units are switched back to the inactive state. After a time governed by the sequence timer or after receiving the confirmation signal 123, the mobile station switches back to the low-power mode. For this purpose, activated units are switched back to the inactive state.

The following text describes how resynchronization of the base station 1 and mobile station 2 is accomplished. As already mentioned, this may be required if the clock transmitters 15, 25 deviate from one another by more than a specific tolerance (in the example about 50 $\mu$s).

When the clock transmitters 15, 25 are no longer synchronized to one another (i.e., the transmitted pulse from the base station 1 and the time for which the receiver 23 in the mobile station 2 is switched on do not overlap), so that the mobile station 2 does not receive any signal from the base station; no interchange of identification data can then take place.

The required resynchronization is then initiated by the occurrence of a specific event which indicates the unsynchronized state. In the example of the car automatic locking system, this may be the operation of a door handle 43 by the driver. When this event occurs, the base station 1 changes to a synchronization mode, in which it transmits a continuous signal, by means of its transmitter 12, for one clock cycle, that is to say five seconds (5 s). Since the receiver 23 in the mobile station 2 is switched on once during the clock cycle, this ensures that the mobile station 2 receives the signal from the base station.

Identification data are then interchanged, as described above, and, if the result is negative (i.e., the base station and mobile station are not associated with one another), the method is ended without synchronization. If the result is positive, the enable function is initiated, and the synchronization process continues as follows. The clock transmitters 15 and 25 are matched. This may be done by resetting their counters 152, 252 to a specific value or by transferring the value of one counter to the other. To do this, the control unit 11 in the base station 1 preferably reads the state of the counter 152 and transmits this by means of the transmitter 12 to the mobile station 2, whose evaluation unit 11 loads the counter 252 with this state via the synchronization module 211. This is particularly advantageous if one base station 1 is associated with a number of mobile stations.

Although, conversely, the counter 152 in the base station 1 can be loaded with the count from the mobile station 2, this leads to difficulties when a number of mobile stations 2 are associated with a base station 1. A dedicated counter for each mobile station would then be required in the base station 1.

The synchronization module 211 reads the count before loading the transmitted count and uses the difference between the counts to calculate a correction factor in order thus to adapt the frequency divider in the clock transmitter as appropriate. In this way, the frequency accuracy of the clock transmitter can be increased beyond the normal value of 500 ppm for quartz crystal clocks.

The signal transmitted by the base station at the start of the synchronization process may be an unmodulated carrier signal as is transmitted as the unmodulated carrier pulse 121 in the low-power mode of the identification method. It may also be a first identification signal 122, for example, an encrypted count of the counter 151. The unmodulated carrier signal 121 then actually comprises additional information which, as in the case of wake-up signals, results in the reception period of the mobile station 2 being lengthened.

The preferred embodiment may also be provided for precautionary resynchronization to be included. Even after a successful identification has taken place (i.e., through identification data interchange), any discrepancies existing between the clock transmitters 15, 25 are eliminated, thus reducing the risk of loss of synchronization.

If required, a further data interchange may then take place, for example diagnosis and status data for the vehicle, such as the mileage, and this can be displayed on a suitable display device on the mobile station.

I claim:

1. A method for identification of a mobile station associated with a base station, wherein the method comprises:
   in a first low-power mode, transmitting a base station signal from the base station on a clock cycle;
   in the first low-power mode, receiving the base station signal at the mobile station on the clock cycle;
   in the first low-power mode, confirming if the mobile station is receiving the base station signal;
   in a second higher-power mode, lengthening a reception time period in synchronism with the clock cycle in the mobile station;
   in the second higher-power mode, interchanging identification data between the mobile station and the base station; and
   first in the low-power mode, shortening the reception time period of the mobile station to less than a transmission time period of the base station.

2. The method described in claim 1 further comprising:
   producing a wake-up signal in the mobile station;
   switching an evaluation unit to an active state once the second high-power mode has been entered,
   transmitting an unmodulated request signal from the mobile station once the second high-power mode had been entered.

3. The method according to claim 1, wherein, in the first low-power mode, the reception time period of the mobile station is one half to one twentieth a transmission time period of the base station.

4. The method according to claim 1, wherein, in the first low-power mode, the reception time period of the mobile station is one-tenth a transmission time period of the base station.

5. The method according to claim 1, wherein the clock period is between one and ten seconds.

6. The method according to claim 1, wherein the clock period is between four and six seconds.

7. The method according to claim 1, wherein a transmission time period of the base station is between ten microseconds and one second.

8. The method according to claim 1, wherein a transmission time period of the base station is between one-hundred microseconds and five milliseconds.

9. The method according to claim 1, wherein said interchanging identification data between the mobile station and the base station is encrypted based on a changing key.

10. The method according to claim 9, wherein said changing key is a count of a clock transmitter.

11. The method according to claim 1, further comprising:
    synchronizing clock transmitters in the base station and in the mobile station.

12. A method for identification of a mobile station associated with a base station, wherein the method comprises:
    in a first low-power mode, transmitting a base station signal from the base station on a clock cycle;
    in the first low-power mode, receiving the base station signal at the mobile station on the clock cycle;
    in the first low-power mode, confirming if the mobile station is receiving the base station signal; in a second higher-power mode, lengthening a reception time period in synchronism with the clock cycle in the mobile station; and
    in the second higher-power mode, interchanging identification data between the mobile station and the base station,
    said interchanging identification data between the mobile station and the base station including:
      transmitting a first identification signal by the base station;
      receiving and evaluating the first identification signal in the mobile station;
      reverting to the first low power mode in the mobile station if the result is negative and transmitting a second identification signal if the result is positive, and
      receiving and evaluating the second identification signal in the base station, the base station reverting to the first low-power mode if the result is negative and carrying out an enable function if the result is positive.

13. The method described in claim 12, further comprising:

producing a wake-up signal in the mobile station;

switching an evaluation unit to an active state once the second high-power mode has been entered, transmitting an unmodulated request signal from the mobile station once the second high-power mode had been entered.

14. The method according to claim 12, wherein, in the first low-power mode, the reception time period of the mobile station is one half to one twentieth a transmission time period of the base station.

15. The method according to claim 12, wherein, in the first low-power modes, the reception time period of the mobile station is one-tenth a transmission time period of the base station.

16. The method according to claim 12, wherein the clock period is between one and ten seconds.

17. The method according to claim 12, wherein the clock period is between four and six seconds.

18. The method according to claim 12, wherein a transmission time period of the base station is between ten microseconds and one second.

19. The method according to claim 12, wherein a transmission time period of the base station is between one-hundred microseconds and five milliseconds.

20. The method according to claim 12, wherein said interchanging identification data between the mobile station and the base station is encrypted based on a changing key.

21. The method according to claim 20, wherein said changing key is a count of the transmitter clock.

22. The method according to claim 12, further comprising:

synchronizing clock transmitters in the base station and in the mobile station.

23. A method for identification of a mobile station associated with a base station, wherein the method comprises:

in a first low-power mode, transmitting a base station signal from the base station on a clock cycle;

in the first low-power mode, receiving the base station signal at the mobile station on the clock cycle;

in the first low-power mode, confirming if the mobile station is receiving the base station signal;

in a second higher-power mode, lengthening a reception time period in synchronism with the clock cycle in the mobile station;

in the second higher-power mode, interchanging identification data between the mobile station and the base station; and synchronizing clock transmitters in the base station and in the mobile station by:
checking that the clock transmitter in the mobile station and the clock transmitter in the base station are unsynchronized and, if this occurs, transmitting a signal for a time period which is at least as long as the clock period minus the time period of receptions, transmitting a synchronization signal between the base station and the mobile station, and setting at least one of the mobile station clock transmitter and the base station clock transmitter with the synchronization signal.

24. The method according to claim 23, wherein the synchronization signal is precise with the clock transmitter of the base station.

25. The method described in claim 23 further comprising:

producing a wake-up signal in the mobile station;

switching an evaluation unit to an active state once the second high-power mode has been entered, transmitting an unmodulated request signal from the mobile station once the second high-power mode had been entered.

26. The method according to claim 23, wherein, in the first low-power mode, the reception time period of the mobile station is one half to one twentieth a transmission time period of the base station.

27. The method according to claim 23, wherein, in the first low-power mode, the reception time period of the mobile station is one-tenth a transmission time period of the base station.

28. The method according to claim 23, wherein the clock period is between one and ten seconds.

29. The method according to claim 23, wherein the clock period is between four and six seconds.

30. The method according to claim 23, wherein a transmission time period of the base station is between ten microseconds and one second.

31. The method according to claim 23, wherein a transmission time period of the base station is between one-hundred microseconds and five milliseconds.

32. The method according to claim 23, wherein said interchanging identification data between the mobile station and the base station is encrypted based on a changing key.

33. The method according to claim 32, wherein said changing key is a count of the clock transmitter.

34. The method according to claim 23, further comprising:

synchronizing the clock transmitters in the base station and in the mobile station.

35. A configuration for identification of a mobile station associated with a base station, comprising:

a base station having a transmitter, a receiver, and a clock transmitter connected to said transmitter and switching on said transmitter upon a clock cycle; and a mobile station having a transmitter, a receiver, a clock transmitter connected to said receiver for switching on said receiver on the clock cycle, a wake-up unit connected downstream of said receiver and having an initial evaluation module, an evaluation unit connected downstream of said wake-up unit, and a reception interval lengthening unit with an input and an output, said input connected to said wake-up unit, said output connected to said clock transmitter, said evaluation unit including a synchronization module connected to a counter and to said receiver and being adapted for loading a corrected count.

36. The configuration according to claim 35, wherein said clock transmitters in the base station and in the mobile station have an oscillating element and a frequency divider unit.

37. The configuration according to claim 36, wherein said oscillating element is a quartz crystal.

38. The configuration according to claim 36, wherein said frequency divider unit is a programmable counter.

39. The configuration according to claim 35, wherein said synchronization module is designed for calculating a correction value from an uncorrected count and a corrected count.

40. A method for identification of a mobile station associated with a base station, wherein the method comprises:

providing a base station having a transmitter and a receiver; and a mobile station having a first low-power mode, a second high-power mode, a transmitter, a receiver, and a clock transmitter connected to said receiver for switching on the receiver on a clock cycle, a wake-up unit connected downstream of the receiver, an evaluation unit connected downstream of the wake-up unit, and a reception interval lengthening unit with an input and an output, the input connected to the wake-up unit, and the output connected to the clock transmitter;

generating a clock signal in the base station with the clock transmitter;

generating a clock signal in the mobile station with the clock transmitter that is equal in length as the clock signal in the base station;

transmitting, over a transmission time period based on the clock signal, a base station signal from the base station in the first low-power mode, the reception time period of the mobile station beings shorter than the transmission time period of the base station;

receiving the base station signal in the mobile station being in the first low-power mode;

determining whether the base station signal is being received in the mobile station;

entering the second high-power mode in the mobile station after the base station signal has been received in the mobile station;

lengthening a time period of reception in synchronism with the clock cycle; and interchanging identification data between the mobile station and the base station.

41. A method for identification of a mobile station associated with a base station, wherein the method comprises:

providing a base station having a transmitter and a receiver; and a mobile station having a first low-power mode, a second high-power mode, a transmitter, a receiver, and a clock transmitter connected to said receiver for switching on the receiver on a clock cycle, a wake-up unit connected downstream of the receiver, an evaluation unit connected downstream of the wake-up unit, and a reception interval lengthening unit with an input and an output, the input connected to the wake-up unit, and the output connected to the clock transmitter;

generating a clock signal in the base station with the clock transmitter;

generating a clock signal in the mobile station with the clock transmitter that is equal in length as the clock signal in the base station;

transmitting periodically, based on the clock signal, a base station signal from the base station in the low-power mode;

receiving the base station signal in the mobile station being in the first low-power mode;

determining whether the base station signal is being received in the mobile station;

entering the second high-power mode in the mobile station after the base station signal has been received in the mobile station;

lengthening a time period of reception in synchronism with the clock cycle; and interchanging identification data between the mobile station and the base station by:

transmitting a first identification signal by the base station;

receiving and evaluating the first identification signal in the mobile station;

reverting to the first low power mode in the mobile station it the result is negative and transmitting a second identification signal if the result is positive, and receiving and evaluating the second identification signal in the base station, the base station reverting to the first low-power mode if the result is negative and carrying out an enable function if the result is positive.

* * * * *